United States Patent [19]

Bednarik

[11] Patent Number: 4,649,613
[45] Date of Patent: Mar. 17, 1987

[54] WELDING TIP REMOVAL TOOL

[76] Inventor: Richard J. Bednarik, 635 Hyatt, Campbell, Ohio 44405

[21] Appl. No.: 773,587

[22] Filed: Sep. 9, 1985

[51] Int. Cl.[4] .............................................. B25P 19/04
[52] U.S. Cl. ........................................ 29/253; 29/270
[58] Field of Search ................. 29/253, 270, 278, 254, 29/275, 239; 254/25, 24, 21, 28, 131

[56] References Cited

U.S. PATENT DOCUMENTS

| | | | |
|---|---|---|---|
| 352,570 | 11/1886 | Pillsbury | 254/26 R |
| 1,425,365 | 8/1922 | Coleman | 254/26 R |
| 1,946,063 | 2/1934 | Dodge | 285/25 |
| 2,545,027 | 3/1951 | Grimm | 254/25 |
| 2,613,562 | 10/1952 | Clark | 29/270 |
| 2,640,382 | 6/1953 | Grossman | 29/253 |
| 2,655,720 | 10/1953 | Durham | 29/275 |
| 3,290,769 | 12/1968 | Kashergen | 29/275 |
| 3,689,977 | 9/1972 | Crabbe | 29/253 |

Primary Examiner—Robert C. Watson
Attorney, Agent, or Firm—Harpman & Harpman

[57] ABSTRACT

A welding tip removal tool for use on spot welding machines as are presently used in the industry. The tool can remove multiple size welding tips by engagement with different dimensioned inclined surfaces multiply positioned within the same tool.

3 Claims, 4 Drawing Figures

WELDING TIP REMOVAL TOOL

BACKGROUND OF THE INVENTION

1. Field of the Invention

This invention relates to tools used to remove welding tips associated with spot welders used in manufacturing today. The welding tips are removed by engagement between the tip and the welder. Present welding tip size configuration requires multiple tools to remove different sized tips commonly used.

2. Description of the Prior Art

Prior art devices of this type have been used on other applications and in different configurations. See for example U.S. Pat. Nos. 1,946,063 and 3,290,769.

In U.S. Pat. No. 1,946,063, a lubrication device is disclosed having a grease fitting removal tool having a single area of engagement for insertion under the fitting for removal.

U.S. Pat. No. 3,290,769 shows a tool for use on excavating equipment teeth. The boss portion 26 of the tool is used as a fulcrum with arms 20 to wedge against the teeth with portions 27 engaging the fulcrum removing the teeth from the excavating equipment.

SUMMARY OF THE INVENTION

A welding tip removal tool having multiple inclined portions of decreasing size to engage and remove welding tips of multiple sizes. The tool configuration is such that it will essentially adjust to the size of the welding tip to be removed, engaging the tip and removing the same off the welder end. The weld tips are friction fit on the welder's end and required the engagement of an inclined Y-shaped tool to establish a wedging relation against the weld tip to remove them.

DESCRIPTION OF THE PREFERRED EMBODIMENT

A welding tip removal tool for use on spot welding equipment currently used in industry which has replaceable welding tips. The tips T shown in broken lines in FIGS. 1 and 2 of the drawings are friction fit on the weld equipment ends, not shown, and are removed as they wear during use. The welding tip removal tool is comprised of a bifurcated body member 10 having a handle portion 11 extending from an end thereof. A pair of oppositely disposed parallel arms 12 and 13 extend from the body member 10, each of the arms is generally cross sectional square and is tapered on its upper surface 14 inwardly from its free end. The tapered upper surface 14 is approximately one-quarter of the arms' overall length and extends to a depth of one-half the arms overall height at its end at 15. The opposing arm surfaces are cutaway at 16 defining a plurality of inclined surfaces on each arm that are identical.

Figures 1, 2:
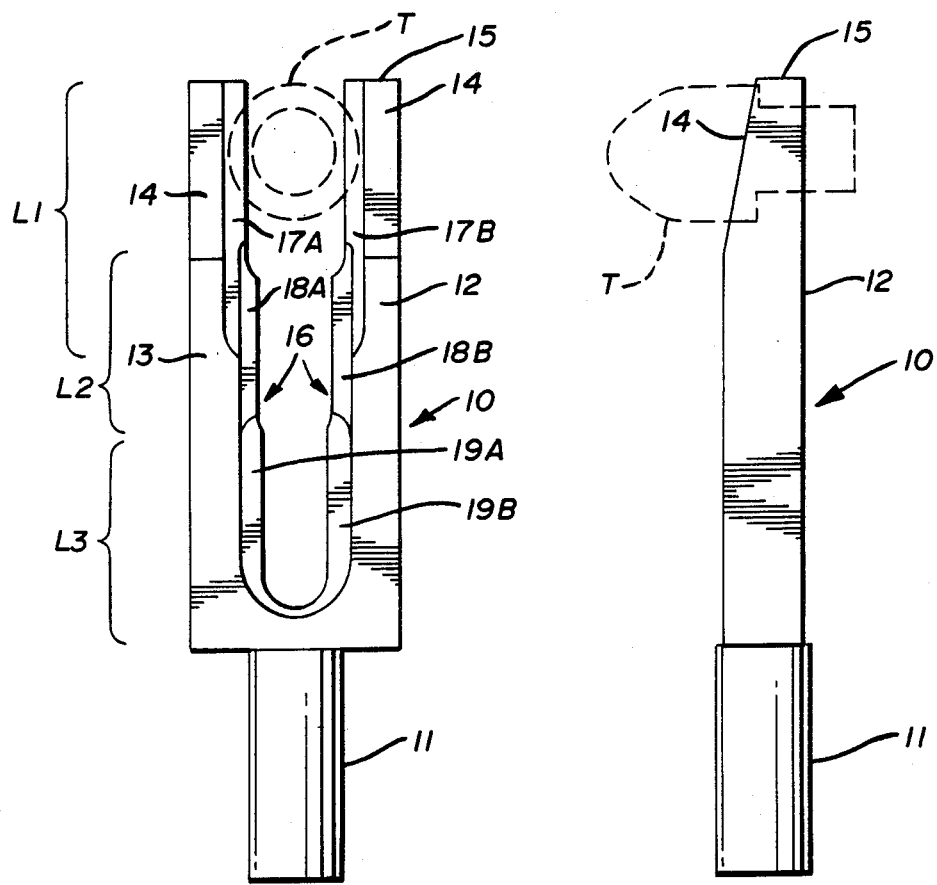
FIG. 1 is a top plan view of the weld tip removal tool with a weld tip shown in broken lines.
FIG. 2 is a side plan view of the weld tip removal tool.
Figures 3, 4:
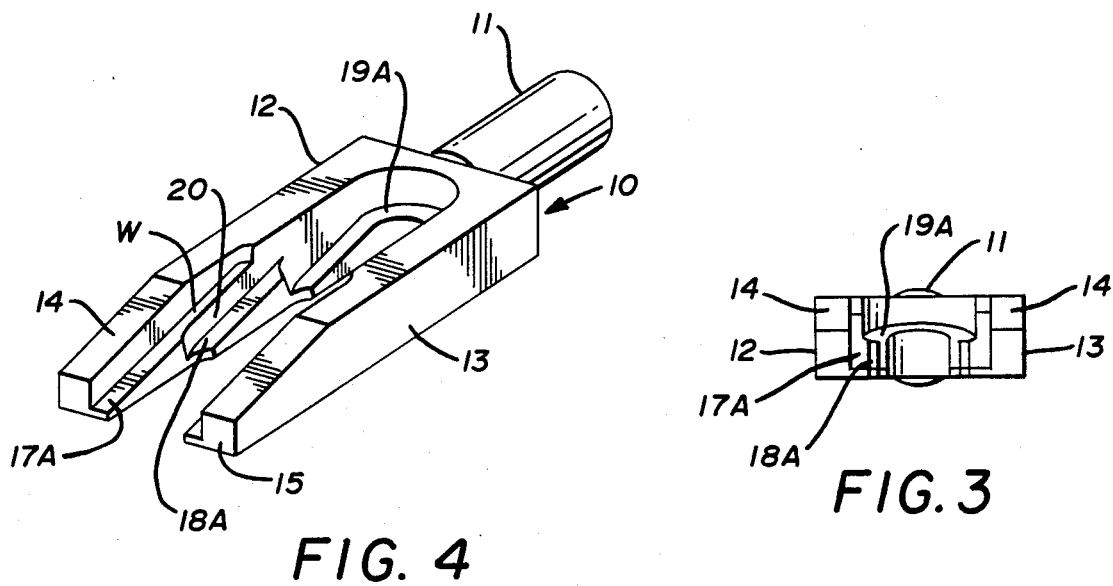
FIG. 3 is an end view of the weld tip removal tool.
FIG. 4 is a perspective view of the weld tip removal tool.

Referring now to FIGS. 1 and 4 of the drawings, the inclined surfaces are indicated as 17A and 17B, 18A and 18B, and 19A and 19B. The inclined surfaces 17A and 17B extend from the bottom of the free end of each arm 12 and 13 to a point approximately one-half the arms' overall length indicated by L1. Inclined surfaces 18A and 18B extend from the bottom of the arms 12 and 13 from a point half the length of L1 to an overall distance defined by L2. Inclined surfaces 19A and 19B extend from the bottom of the arms 12 and 13 from a point inwardly of the upper end of L2 to an overall distance defined by L3. Inclined surfaces 19A and 19B join one another defining an arcuate configuration adjacent to the terminal end of the bifurcated body member 10.

It will be evident from the above description that each pair of inclined surfaces have a different relative transverse spacing therebetween with the inclined surfaces 17A and 17B having the greatest transverse spacing and inclined surfaces 19A and 19B the least transverse spacing as best seen in FIG. 1 of the drawings. Each of the inclined surfaces has the same angle of inclination, all engagable on the same horizontal plane with the weld tips T to be removed.

Due to the overlapping of the inclined surfaces lengths L1 and L2, the vertical side adjacent the overlap is recessed along a portion 20 seen in FIG. 4 of the drawings which correspondingly diminishes the width W of the inclined surfaces 17A and 17B adjacent the overlap.

In operation, the weld tip removal tool is positioned on the weld tip T on the corresponding inclined surface matching the tip size and advanced lifting the weld tip off.

It will thus be seen that a new and useful invention has been illustrated and described and that it will be apparent to those skilled in the art that various changes and modifications may be made therein without departing from the spirit of the invention and having thus described my invention, what I claim is:

1. A weld tip removal tip comprising a bifurcated elongated body member, having oppositely disposed vertical sides, a handle attached to said body member, a plurality of oppositely disposed elongated inclined surfaces extending inwardly from the free ends of said bifurcated body member along the length thereof a recess portion along the vertical side of said bifurcated elongated body member adjacent at least one of said inclined surfaces overlapping the next adjacent of said inclined surfaces, each of said oppositely disposed inclined surfaces defining an area there between greater than the next adjacent oppositely disposed inclined surfaces extending progressively outwardly from said handle.

2. The weld tip removal tool of claim 1 wherein said means for overlapping a portion of at least two of said inclined surfaces comprises a recessed portion along the vertical sides of said bifurcated elongated body member adjacent at least one of said inclined surfaces overlapping the next adjacent of said inclined surfaces.

3. The weld tip removal tool of claim 1 wherein at least one of said inclined surfaces has an area of diminished width adjacent the recessed portion along the vertical side of said bifurcated elongated body member.